(12) United States Patent
Guion et al.

(10) Patent No.: US 6,671,124 B2
(45) Date of Patent: Dec. 30, 2003

(54) SHOCK AND VIBRATION SYSTEM

(75) Inventors: Robert Dennis Guion, St. Paul, MN (US); David Roy Wagner, St. Paul, MN (US); Denis Allen LaCroix, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 38 days.

(21) Appl. No.: 09/948,158

(22) Filed: Sep. 7, 2001

(65) Prior Publication Data

US 2003/0048743 A1 Mar. 13, 2003

(51) Int. Cl.$^7$ .................. G11B 33/14; F16M 13/00; F16F 1/36
(52) U.S. Cl. ............ 360/97.02; 248/603; 248/632; 248/638; 267/136; 267/153
(58) Field of Search ............ 360/97.02, 97.03, 360/97.01; 361/683, 685; 369/75.1, 263; 248/562, 603, 604, 632, 634, 638; 267/136, 141, 141.4, 153, 160

(56) References Cited

U.S. PATENT DOCUMENTS

| | | | | |
|---|---|---|---|---|
| 4,831,476 A | * | 5/1989 | Branc et al. ............ 360/97.02 |
| 4,980,786 A | * | 12/1990 | O'Sullivan et al. ...... 360/97.03 |
| 5,042,024 A | * | 8/1991 | Kurosawa et al. ......... 369/75.1 |
| 5,349,486 A | * | 9/1994 | Sugimoto et al. ........ 360/97.01 |
| 5,379,990 A | * | 1/1995 | Ando et al. ................ 267/34 |
| 5,400,196 A | * | 3/1995 | Moser et al. ............ 360/97.02 |
| 5,532,993 A | * | 7/1996 | Yanagisawa et al. ...... 369/75.1 |
| 5,740,011 A | * | 4/1998 | Kobayashi et al. ......... 361/685 |
| 5,958,212 A | * | 9/1999 | Yamamura et al. ......... 205/723 |
| 6,249,504 B1 | * | 6/2001 | Iwanaga .................... 369/247 |
| 6,292,455 B1 | * | 9/2001 | Saruwatari et al. ......... 369/263 |

FOREIGN PATENT DOCUMENTS

| | | | | |
|---|---|---|---|---|
| EP | 328260 A2 | * | 8/1989 | ........... G11B/33/02 |
| EP | 341957 A2 | * | 11/1989 | ........... G11B/33/00 |
| JP | 03239831 A | * | 10/1991 | ........... F16F/13/00 |
| JP | 03239837 A | * | 10/1991 | ........... F16F/15/08 |
| JP | 06176555 A | * | 6/1994 | ........... G11B/33/12 |
| JP | 08334140 A | * | 12/1996 | ........... F16F/09/04 |
| JP | 09079448 A | * | 3/1997 | ........... F16L/21/02 |
| JP | 10092165 A | | 4/1998 | ........... G11B/33/08 |
| JP | 2000030424 A | | 1/2000 | ........... G11B/33/08 |
| JP | 2000163944 A | | 6/2000 | ........... G11B/33/08 |
| JP | 2001057066 A | | 2/2001 | ........... G11B/33/02 |

* cited by examiner

Primary Examiner—William Klimowicz
(74) Attorney, Agent, or Firm—Patrick Hogan

(57) ABSTRACT

A shock and vibration isolation system for an article comprising a set of elastomers circumferentially positioned in a shear mode around a member carried by the article to simultaneously support the article and to isolate the article from shock and vibration by dissipation of energy through an internal shear action within the set of elastomers.

17 Claims, 3 Drawing Sheets

SHOCK AND VIBRATION SYSTEM

FIELD OF THE INVENTION

This invention relates generally to shock and isolation systems for shock sensitive articles and, more specifically, to shock and isolation system for disk drives that both support the disk drive and isolate the disk drive from external shock and vibration forces.

CROSS REFERENCE TO RELATED APPLICATIONS

None.

STATEMENT REGARDING FEDERALLY SPONSORED RESEARCH OR DEVELOPMENT

None.

REFERENCE TO A MICROFICHE APPENDIX

None

BACKGROUND OF THE INVENTION

One of the difficulties with sensitive equipment such as computer disk drives is the need to provide effective isolation mounts that damp out shock and vibration forces to the disk drive yet allow the disk drive to be removed for servicing. Unfortunately, computer systems and disk drives need to mounted in areas that are subject to shock and vibration. The present invention allows one to mount a shock sensitive article such as a disk drive to effectively damp out vibrations and shocks thereto by circumferentially positioning a set of elastomers around a multi-faced member so that regardless of the orientation of the shock and vibration forces substantially all the elastomers are in a shear mode to thereby effectively damp out damaging shock or vibration forces.

SUMMARY OF THE INVENTION

A shock and vibration isolation system for an article comprising a set of elastomers circumferentially positioned in a shear mode around a member carried by the article to simultaneously support the article and to isolate the article from shock and vibration by dissipation of energy through an internal shear action within the set of elastomers.

DESCRIPTION OF THE PREFERRED EMBODIMENT

Figure 1:
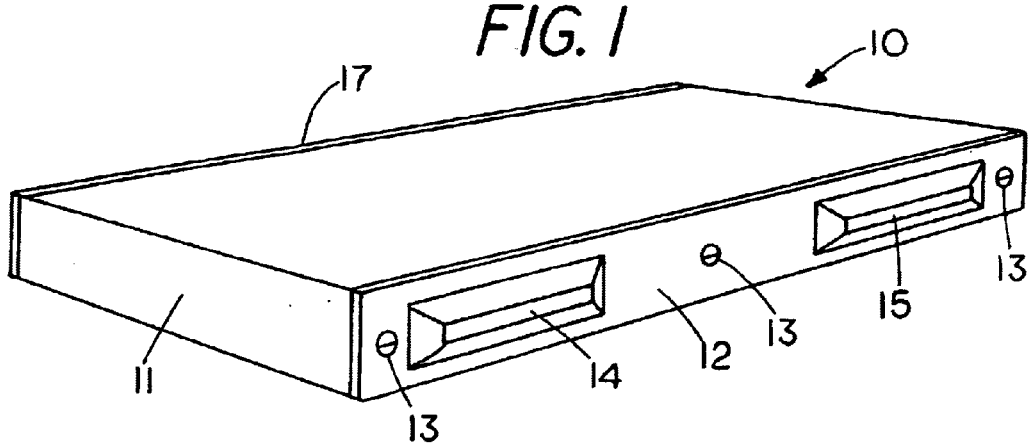
FIG. 1 is a perspective of a disk drive having a base member with a set of truncated pyramid shaped base members.

FIG. 1 is a perspective view of a disk drive mounted within a rectangular shaped housing 11 with a first elongated base 12 mechanically secured to one side of housing 11 by a set of three screws 13. Similarly, a second base member 17 is secured to the opposite edge of housing 11 by a second set of three screws (not shown).

Located on one end of base 12 is a truncated pyramid shaped member 14 and located on the opposite end of base 12 is a second truncated pyramid shaped member 15. Similarly, located on the oppose side of housing 11 is a second base 17 which is identical to base 12 and also includes two truncated pyramid shaped members.

Thus the two bases 12 and 17 are secured directly to opposite sides of the disk drive housing 11 to provide a rigid link thereto. One of the problems encountered with devices such as disk drives is that disk drives are partially vulnerable to frequencies in the range of 350 to 650 cycles per second. The shock and isolation system of the present invention has been found to provide effective isolation for frequencies in the range of 350 to 650 cycles per second to thereby minimize problems of disk failures.

Figure 2:
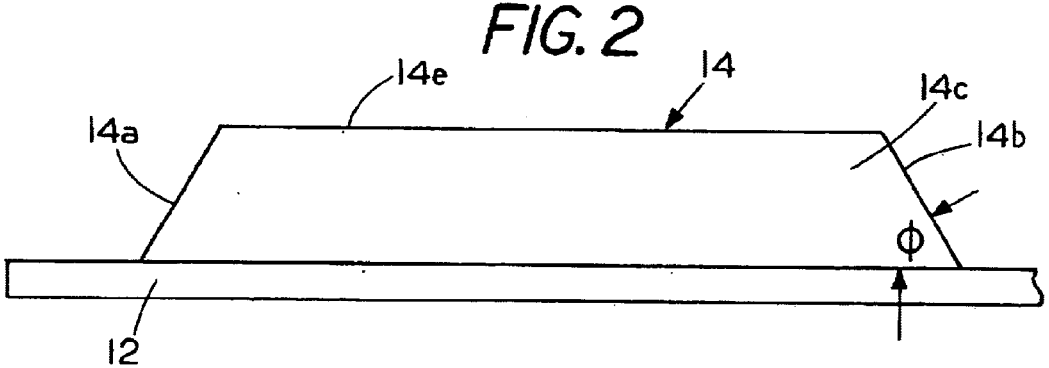
FIG. 2 is a top view of one of the base members shown in FIG. 1.
Figure 3:
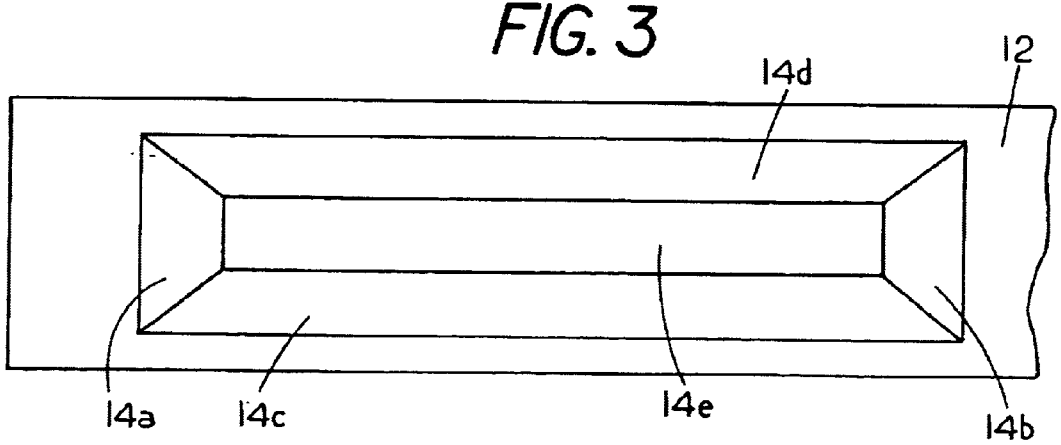
FIG. 3 is a front view of one of the base members shown in FIG. 1.
Figure 4:
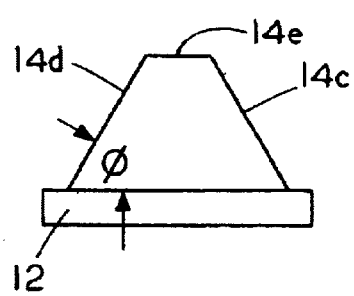
FIG. 4 is an end view of one of the base members shown in FIG. 1.

FIG. 2 to FIG. 4 show a portion of base 12 with the truncated pyramid shaped member 14 extending outwardly therefrom. Member 14, which is made from a rigid material such as metal, includes a first angled face 14a, a second angled face 14b, a third angled face 14c and a fourth angled face 14d with a top surface 14e. The member 14 is secured to base 12 to provide a rigid link to the housing of disk drive 11. In the embodiment shown each of the faces of the pyramid shaped member 14 form an angle ø of about 45 degrees with the base 12.

Figure 5:
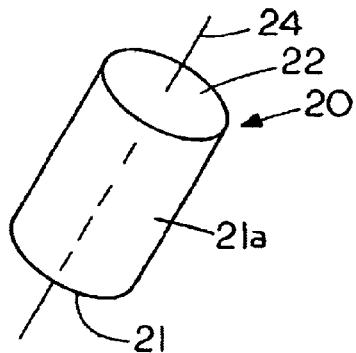
FIG. 5 is an elevation view of one of the elastomers for use in the present invention.

FIG. 5 is a perspective view of a cylindrical shaped elastomer 20 having a first end 21 and a second end 22 with a cylindrical shaped body 21a. Elastomer 20 preferable can be made from materials such as natural rubbers and synthetic resins such as polyvinyl chlorides, polyurethane, polyaniides polystyrenes, copolymerized polyvinyl chlorides, and poloyolefine synthetic rubbers as well as synthetic materials such as urethane, EPDM, styrene-butadiene rubbers, nitrites, isoprene, chioroprenes, propylene, and silicones. The particular type of elastomeric material is not critical but urethane material sold under the trademark Sorbothane® is currently employed. Suitable material is also sold by Aero E.A.R. Specialty Composites, as Isoloss VL. The registrant of the mark Sorbothane® for urethane material is the Hamiltion Kent Manufacturing Company (Registration No. 1,208,333), Kent, Ohio 44240.

Figure 6:
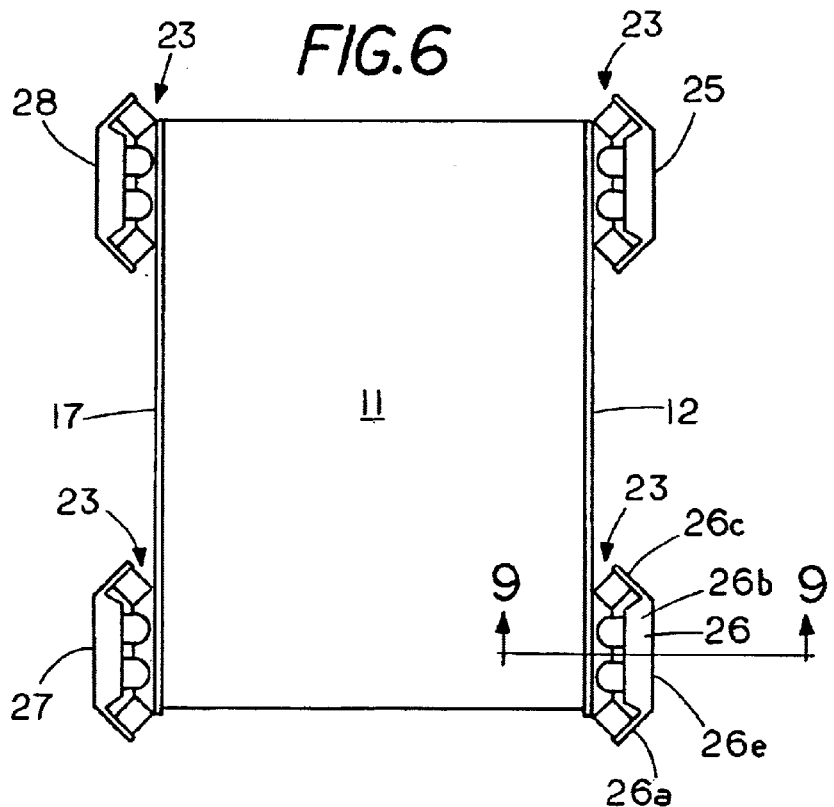
FIG. 6 is a top view of a disk drive supported by a set of elastomers positioned in a shear mode.
Figure 7:
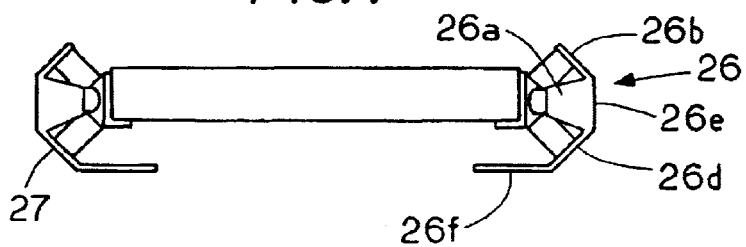
FIG. 7 is an end view of the disk drive of FIG. 6 showing the set of elastomers positioned in the shear mode.
Figure 8:
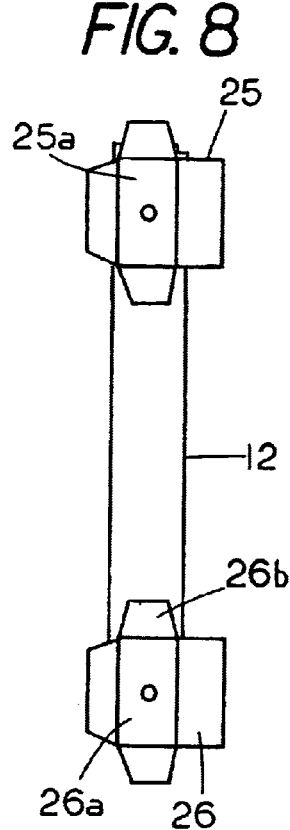
FIGS. 8 and 9 are side views of the disk drive of FIG. 6 showing the support housing for mounting to a frame.

FIG. 6 to FIG. 8 shows a disk drive housing 11 supported by four sets of elastomers 23, each positioned in a shear mode on each of the four corners of the disk drive housing 11. That is, located on one corner of disk drive 11 is a first support housing 25, located on a second corner is a second support housing 26, located on a third corner is a third support housing 27 and located on the fourth corner is a fourth support housing 28. Each set of elastomers 23 is held in circumferential position surrounding a pyramid shape member by the respective support housing to provide both a static and dynamic support to the housing 11. In the embodiment shown two elastomers are adhesively secured to tab 26c, one is secured to tab 26b, one is secured to tab 26a and two are secured to tab 26d with each of the ends of the elastomers extending inward to engage a face on the pyramid shaped member 14. As a result, the circumferential spaced elastomers create a cup like engagement with the faces of the pyramid shaped member 14. This provides a dual purpose, in the static mode the coaction supports the housing in a fixed position. In a dynamic condition the elastomers are allowed to flex and bend and absorb harmful shock and vibration energy through a shear mode to prevent damage to the disk drive which is secured to bases 12 and 17.

As each of the set of elastomers 23 and the support housings 25, 26, 27 and 28 are identical only one will be described herein. Support housing 26 includes a set of tabs 26a, 26b, 26c and 26d which cantileverly extend outward from a base 26e to form a cup-like circumferential housing for supporting an elastomer between the faces of pyramid shaped member 14 and the tabs of the housing 26. Housing 26 includes a further extension or wing 26f for securing the support housing to a support frame or the like so that the support housings can both support and isolate the disk drive housing 11 from external shock and vibration.

Figure 9:
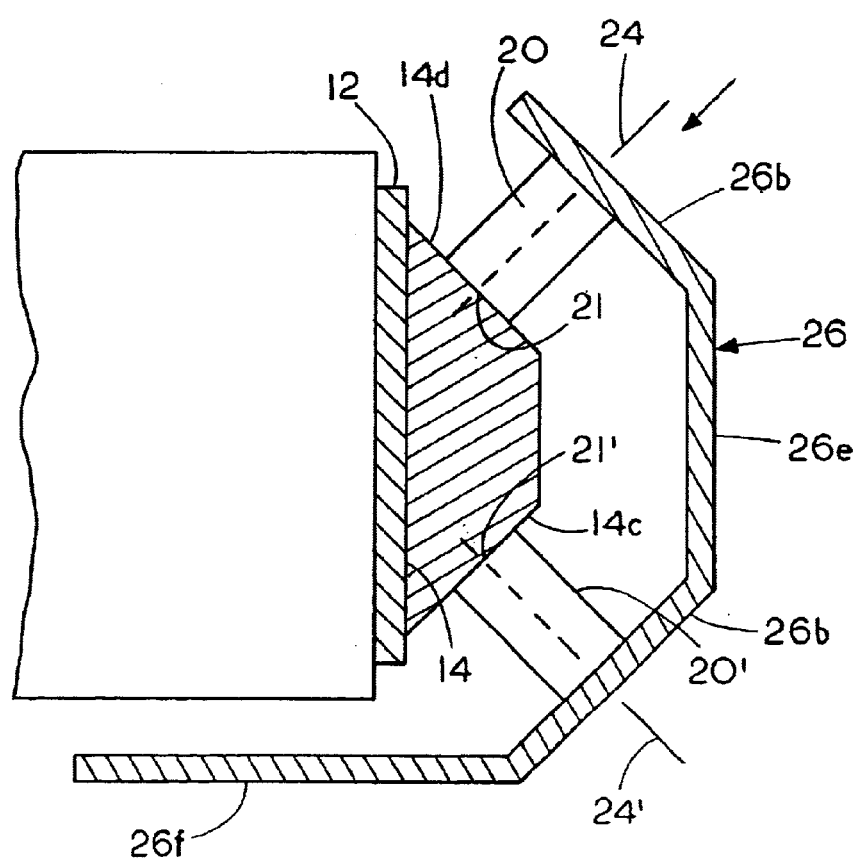

In order to illustrate the operation of the invention reference should be made to FIG. 9 which shows a partial cross sectional view taken along lines 9—9 of FIG. 6. FIG. 9 show the positioning of two of the individual cylindrical elastomers 20 and 20' between the base truncated pyramid shaped member 14 and the support housing 26. As all of the elastomers are similarly positioned with respect to the faces of the pyramid shaped members they will not be described herein. Elastomer 20 is positioned with one end 21 on surface 14d and the other end supported by tab 26b. Similarly one end of elastomer 20' has a first end 21' positioned on face 14c and the opposite end in engagement with tab 26b. The elastomer can be secured to the support housing by a suitable adhesive or the like. While the preferred embodiment discloses cylindrical elastomers, other shapes could be used as long as the elastomers are mounted in a shear mode. Likewise, the angled surface of the pyramid shaped members are preferably at an angle of 45 degrees; however, a greater or small angle could be used as long as the relationship between the support housing and the pyramidal shaped members ensures that the elastomers are in shear in response to a shock or vibration force.

FIG. 9 illustrates how the member 14 is restrained from movement in both the upward and downward direction by the elastomers 20 and 20'. Restraint in the lateral direction is provided by the coaction of support housing 26 and 27. Restraint in the direction into and out of the paper is provide by the elastomers secured to tab 26a and 26b. As a result the elastomers coact to confine displacement of member 14 in three mutually perpendicular directions.

In the embodiment shown elastomer 20 has a central axis 24 that extends normal to the surface 14d and tab 26b. Similarly, elastomer 20' has a central axis 24' that extends normal to the surface 14c and tab 26d. With the elastomer angularly positioned and held in circumferential position around pyramid shaped member 14 substantially all of elastomers are maintained in a shear condition to damp out the effects of external shocks or vibration. That is, a motion along axis 24 could produce a compression force in elastomer 20; however, the elastomer 20' on the opposite side as well as all the other elastomers are maintained in a shear condition thus ensuring that the substantially all the forces are absorbed by shear within the elastomers. Thus the present invention maintains substantially all the elastomers in a shear condition to effective damp out shock and isolation forces by a three dimensional capture of the truncated pyramid shape member within the ends of the elastomers that extend convergently outward from the tabs of the support housing. In embodiment shown all of the elastomers are positioned in a shear mode when the disk drive is supported in a horizontal condition. While each of the faces of the multi-face members are shown as separate distinct faces the junctions between each of the faces of the multi-face member could be blended to provide a multi-faced member having a continuous surface.

We claim:

1. A shock and vibration isolation system comprising:
   a member for mounting to an article to be isolated from shock and vibration, said member comprising a pyramid shaped member having at least four faces;
   a support housing having at least four cantileverly extending tabs; and
   a set of elastomers, each of said elastomers having a central axis and a first end in engagement with said support housing and a second end in engagement with one of the plurality of faces of said member with said elastomers oriented at a different angle from the support housing so that a second end of said elastomers coact to confine displacement of said member in three mutually perpendicular directions.

2. The shock and vibration isolation system of claim 1 wherein each of the plurality of faces are located at an angle of 45 degrees with respect to a base for the member.

3. The shock and vibration isolation system of claim 1 including at least four sets of elastomers with each of said sets positioned proximate a corner of the article to be isolated from shock and vibration.

4. The shock and vibration isolation system of claim 1 wherein each of the elastomers have a cylindrical shape and the tabs on the support housing are located in a spaced parallel condition from a corresponding face on the pyramid shaped member.

5. The shock and vibration isolation system of claim 1 wherein each of the elastomers have a central axis positioned at an angle of 45 degrees to the support housing.

6. The shock and vibration isolation system of claim 1 wherein the article is a disk drive.

7. The shock and vibration isolation system of claim 1 wherein the member comprises a truncated pyramid shaped member.

8. The shock and vibration isolation system of claim 7 wherein all of the elastomers are positioned in a shear mode when the article is supported in a horizontal condition.

9. A shock and vibration isolation system comprising;
   a first base for securing to one side of an article to be isolated from shock and vibration;
   a second base for securing to an opposite side of the article to be isolated from shock and vibration;
   a multi-face member secured to each of said bases, said multi-face member comprising a pyramid shaped member having at least four faces;
   a support housing positionable proximate each of said multi-face members, said support housing including at least four cantileverly extending tabs, said support housing carrying a plurality of elastomers each positioned so that relative displacement between said multi-face members and said support housing always produces a shear action in substantially all of said plurality of elastomers to thereby damp a shock and vibration force to the support housing and protect the article to be isolated from shock and vibration forces.

10. The shock and vibration isolation system of claim 9 wherein the article to be isolated comprises a disk drive to be protected from vibration forces in the range of 350 to 650 Hertz.

11. The shock and vibration isolation system of claim 9 wherein each of the elastomers have a central axis and are positioned so each of the central axis are not normal to either of said bases.

12. The shock and vibration isolation system of claim 9 wherein each of the elastomers comprise cylindrical members each having a first end in engagement with a face of a multi-face member and another end supported by the support housing so that in response to a shock or vibration the shock and vibration isolation system can respond in a shear mode.

13. A method of isolating an article from shock and vibration comprising:

forming a set of multi-faced members with each multi-faced member having at least four faces thereon;

positioning a base of said set of multi-faced members on each side of an article to be simultaneously supported and protected from shock and vibration;

positioning a housing carrying a plurality of elastomers proximate each of said multi-faced members with each of the plurality of elastomers angularly positioned with respect to one another so the plurality of elastomers coact to confine displacement of the base to thereby support the article and to maintain the elastomers in a shear mode so that a shock and vibration force is damped by an internal shear action within the plurality of elastomers.

14. The method of claim 13 including the step of positioning each of the elastomers at an angle of about 45 degrees to said base member.

15. The method of claim 13 including the step of positioning at least four elastomer members on each of said set of multi-faced members.

16. The method of claim 13 including the step of mechanically securing each of the base members to the article to be isolated from shock and vibration.

17. The method of claim 13 including the step of adhesively securing each of the elastomers to the housing to thereby hold each of the elastomers in a shear mode.

* * * * *